United States Patent [19]

Maple

[11] Patent Number: 5,523,562
[45] Date of Patent: Jun. 4, 1996

[54] OPTICAL SCANNER HAVING ENHANCED DEPTH OF ILLUMINATION

[75] Inventor: Larry E. Maple, Fort Collins, Colo.

[73] Assignee: Hewlett-Packard Company, Palo Alto, Calif.

[21] Appl. No.: 331,437

[22] Filed: Oct. 31, 1994

[51] Int. Cl.$^6$ .................................................. H01J 3/14
[52] U.S. Cl. .......................... 250/235; 250/208.1; 355/25; 362/16
[58] Field of Search ........................... 250/208.1, 208.2, 250/208.3, 235, 236, 239; 355/75, 23–26, 55, 67; 362/285, 6, 219, 166, 303, 305, 16–18; 358/475; 235/462,472

[56] References Cited

U.S. PATENT DOCUMENTS

| | | | |
|---|---|---|---|
| 4,709,144 | 11/1987 | Vincent | 250/226 |
| 4,870,268 | 9/1989 | Vincent et al. | 250/226 |
| 4,926,041 | 5/1990 | Boyd | 250/226 |
| 4,980,720 | 12/1990 | Siegel | 355/25 |
| 5,038,028 | 8/1991 | Boyd et al. | 250/208.1 |
| 5,227,620 | 7/1993 | Elder et al. | 250/208.1 |
| 5,335,158 | 8/1994 | Kaplan et al. | 362/303 |

*Primary Examiner*—Edward P. Westin
*Assistant Examiner*—Que T. Le

[57] ABSTRACT

An optical scanner having enhanced depth of illumination may comprise an elongate light source positioned along a longitudinal axis for illuminating points contained within a scan plane bounded at an upper edge by a far limit focal plane and at a lower edge by a near limit focal plane. A first light shade and a second light shade are positioned in spaced apart relation to one another and to the elongate light source. The first and second light shades define a lamp aperture that subtends a first angle with respect to a first line defined by the intersection of the scan plane with the near limit focal plane and that subtends a second angle with respect to a second line defined by the intersection of the scan plane with the far limit focal plane.

29 Claims, 8 Drawing Sheets

2

OPTICAL SCANNER HAVING ENHANCED DEPTH OF ILLUMINATION

BACKGROUND

This invention relates to optical scanners in general and more specifically to a light source assembly for a scanner that provides enhanced depth of illumination.

Optical scanners are well-known in the art and produce machine-readable data which are representative of a scanned object, e.g. a page of printed text. Most optical scanners employ line-focus systems in which light from an illuminated scan line on the object is imaged by a lens onto a linear photosensor array or detector positioned remotely from the object. The linear photosensor array is typically a single dimension array of photoelements that correspond to small area locations along the illuminated scan line. These small area locations are commonly referred to as "picture elements" or "pixels." Each photoelement produces a data signal that is representative of the intensity of light from the corresponding pixel. The data signals from the photoelements are received and processed by an appropriate data processing system which may subsequently store the data on a suitable medium or generate a display signal therefrom for reproducing an image of the object with a display device such as a CRT or a printer.

Optical scanners and various components thereof are disclosed in U.S. Pat. Nos. 4,926,041 for OPTICAL SCANNER of David Wayne Boyd; 4,709,144 for COLOR IMAGER UTILIZING NOVEL TRICHROMATIC BEAM SPLITTER AND PHOTOSENSOR of Kent J. Vincent; 4,870,268 for COLOR COMBINER AND SEPARATOR AND IMPLEMENTATIONS of Kent J. Vincent and Hans D. Neuman; 5,038,028 for OPTICAL SCANNER APERTURE AND LIGHT SOURCE ASSEMBLY of Boyd, et al.; and 5,227,620 for APPARATUS FOR ASSEMBLING COMPONENTS OF COLOR OPTICAL SCANNERS of Elder, et al., which are each hereby specifically incorporated by reference for all that is disclosed therein.

While optical scanners of the type described above are useful for scanning objects that can be placed flat on the platen glass of the scanner, such as pages of printed text, there are instances where it is desirable to scan objects that cannot be made to lay completely flat, such as the pages of an opened hardbound book, or other objects that cannot be made to lay flat on the platen glass of the scanner. If such objects are to be scanned, the optical system of the scanner should be provided with a large depth of field so that the images of those points that do not lay directly on the platen glass will also be focused on the detector. Used in this sense, the term "depth of field" is defined as the distance between a near limit focal plane and a far limit focal plane; the images of those points on an object that are located between the near and far limit focal planes being substantially focused on the detector.

While scanners with optical systems having such large depths of field are known, it is difficult to provide an illumination system that can properly illuminate all points on the object that lay within such a large depth of field. Consider, for example, an illuminated scan line S on an object O, shown in FIG. 1, the image of which is focused onto the surface of a detector D by a lens L. In order for the detector D to capture the desired detail of the object O along the entire scan line S, all portions of the illuminated object O in the scan line S should equally illuminate the surface of the detector D. Unfortunately, however, the illumination, i.e., the density of luminous flux, on the surface of detector D varies inversely with the square of the distance from the illuminated object O (a luminous source) and directly with the cosine of the angle $\theta$ between the luminous flux and the normal N to the surface of detector D. Therefore, the illumination on the surface of the detector D decreases rapidly towards each end, and some means for compensating for this reduction in illumination must be found if the detector is to have the same effective sensitivity for points near each end of the scan line as it does for points near the center of the scan line.

The illumination problems described above tend to be even more severe when scanning objects within a relatively large depth of field. Consider, for example, those points on the object that are located near the far limit focal plane of an optical system ("far points"). Not only are such "far points" farther from the detector, they are also usually farther from the illuminating light source as well. Of course, points that are farther from the light source will receive less illumination in accordance with the inverse square law described above. Therefore, the illumination loss at the detector when scanning objects within a relatively large depth of field is due to two factors: 1) the increased distance that such "far points" are located from the detector; and 2) the fact that such far points receive less illumination from the light source in the first place. All in all, the illumination problems associated with scanning objects within a relatively large depth of field tend to be the most severe for those points on the object that are located near the ends of the scan line and also near the far limit focal plane.

Another problem stems from the fact that the fluorescent lamps commonly used to illuminate the object being scanned are usually subject to intensity variations along their lengths. For example, it is common for a fluorescent lamp to produce light of a greater intensity at points near the center of the lamp than at points near the ends of the lamp. Therefore, while it may be possible to use such a fluorescent lamp to provide a satisfactory depth of illumination for points near the center of the scan line, the decreased intensity near the ends of the lamp only aggravates the problem of illuminating sufficiently those points located near the ends of the scan line and/or located near the far limit focal plane, as described above.

Therefore, there remains a need for an optical scanner having enhanced depth of illumination to increase the effective depth of field of the scanner. For good scanner performance, the illumination should be substantially uniform across the entire depth of field, that is, the illumination provided to the "far points" on the object (i.e., those points located at about the far limit focal plane of the scanner optical system) should be sufficient to allow them to be detected by the detector assembly. At the same time, however, the illumination provided to the "near points" on the object (i.e., those points located at about the near limit focal plane) should not be so great so as to adversely affect scanner performance or overload or "swamp" the detector. The enhanced illumination should also be uniform along the length of the scan line, so that the effective depth of field of the scanner is substantially uniform along the entire length of the scan line. Ideally, the depth of illumination should also correspond roughly to the depth of field of the scanner optical system.

SUMMARY OF THE INVENTION

An optical scanner having enhanced depth of illumination may comprise an elongate light source positioned along a longitudinal axis for illuminating points contained within a scan plane bounded at an upper edge by a far limit focal plane and at a lower edge by a near limit focal plane. A first light shade and a second light shade are positioned in spaced apart relation to one another and to the elongate light source. The first and second light shades define a lamp aperture that subtends a first angle with respect to a first line defined by the intersection of the scan plane with the near limit focal plane and that subtends a second angle with respect to a second line defined by the intersection of the scan plane with the far limit focal plane.

BRIEF DESCRIPTION OF THE DRAWING

Illustrative and presently preferred embodiments of the invention are shown in the accompanying drawing in which:

FIG. 8(*b*) is a side view in elevation of the schematic shown in FIG. 8(*a*);

DETAILED DESCRIPTION OF THE INVENTION

Figure 1:
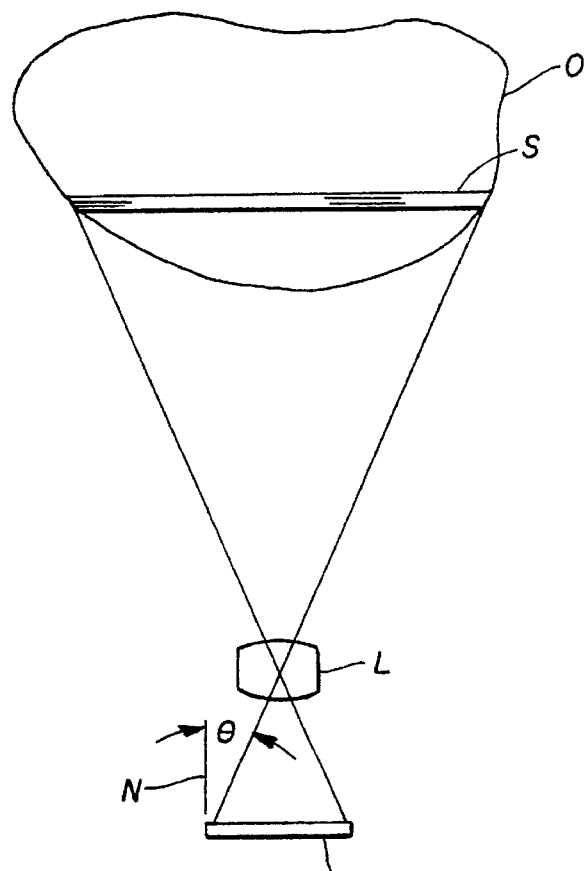
FIG. 1 is a schematic view of a basic optical system of a scanner for focusing the image of an illuminated scan line on an object onto a detector array.
Figure 2:
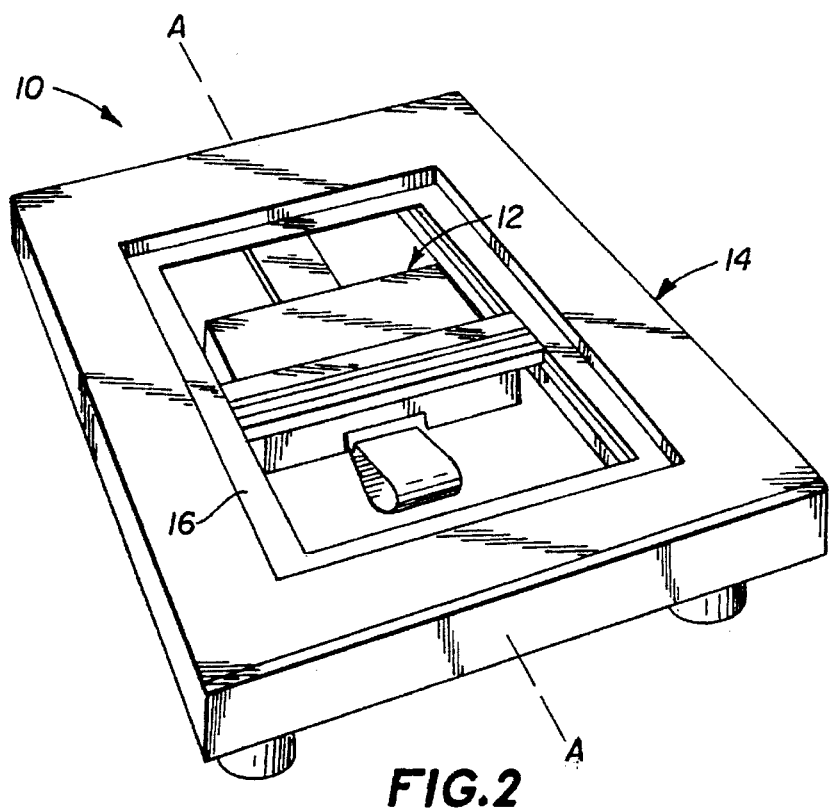
FIG. 2 is a perspective view of an optical scanner having enhanced depth of illumination showing the general arrangement of the moveable carriage assembly within the scanner housing.
Figure 3:
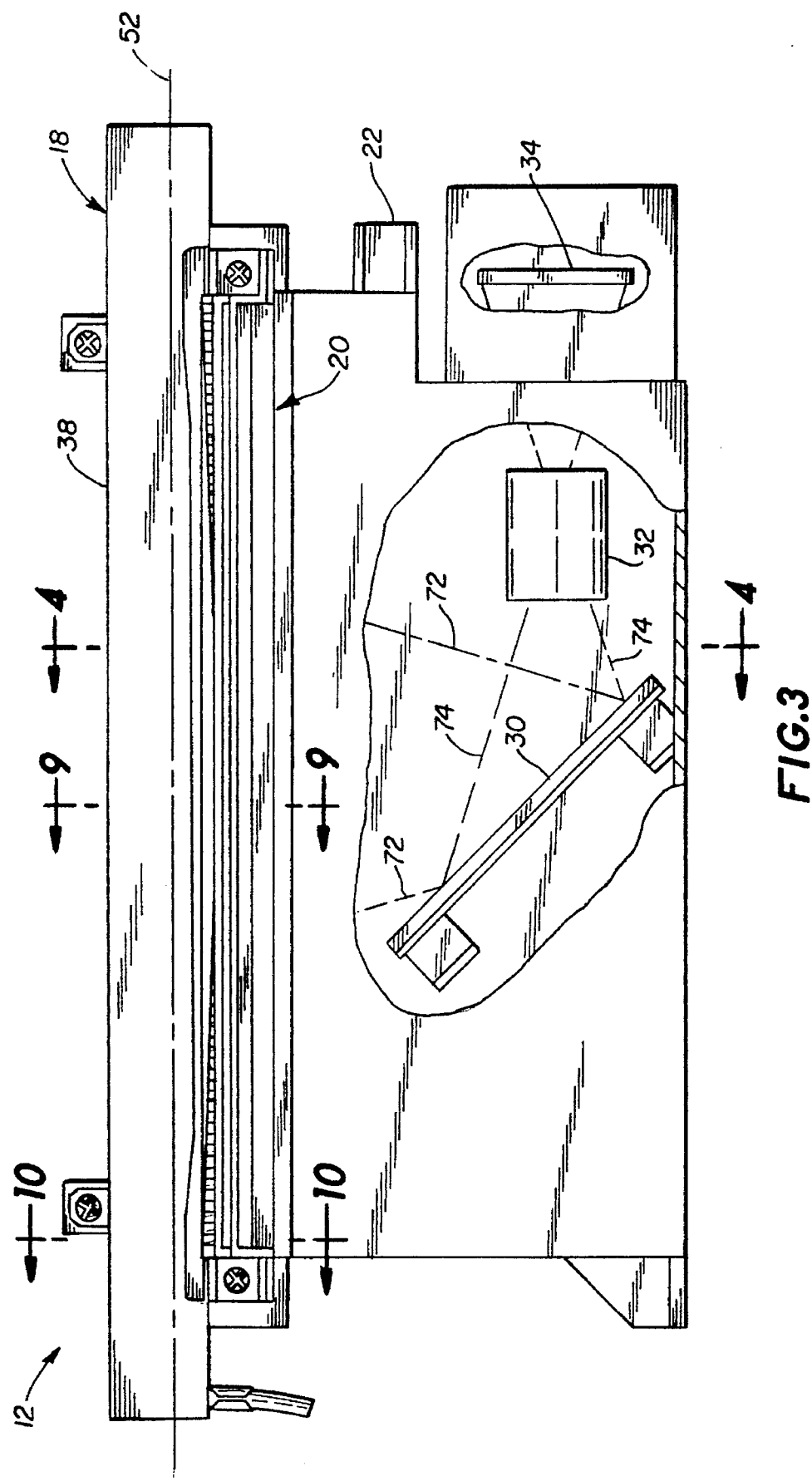
FIG. 3 is a plan view of the carriage assembly showing the arrangement of the lamp and slit aperture assemblies and with a portion of the carriage housing broken away to show the positions of the lens and detector assemblies.
Figure 4:
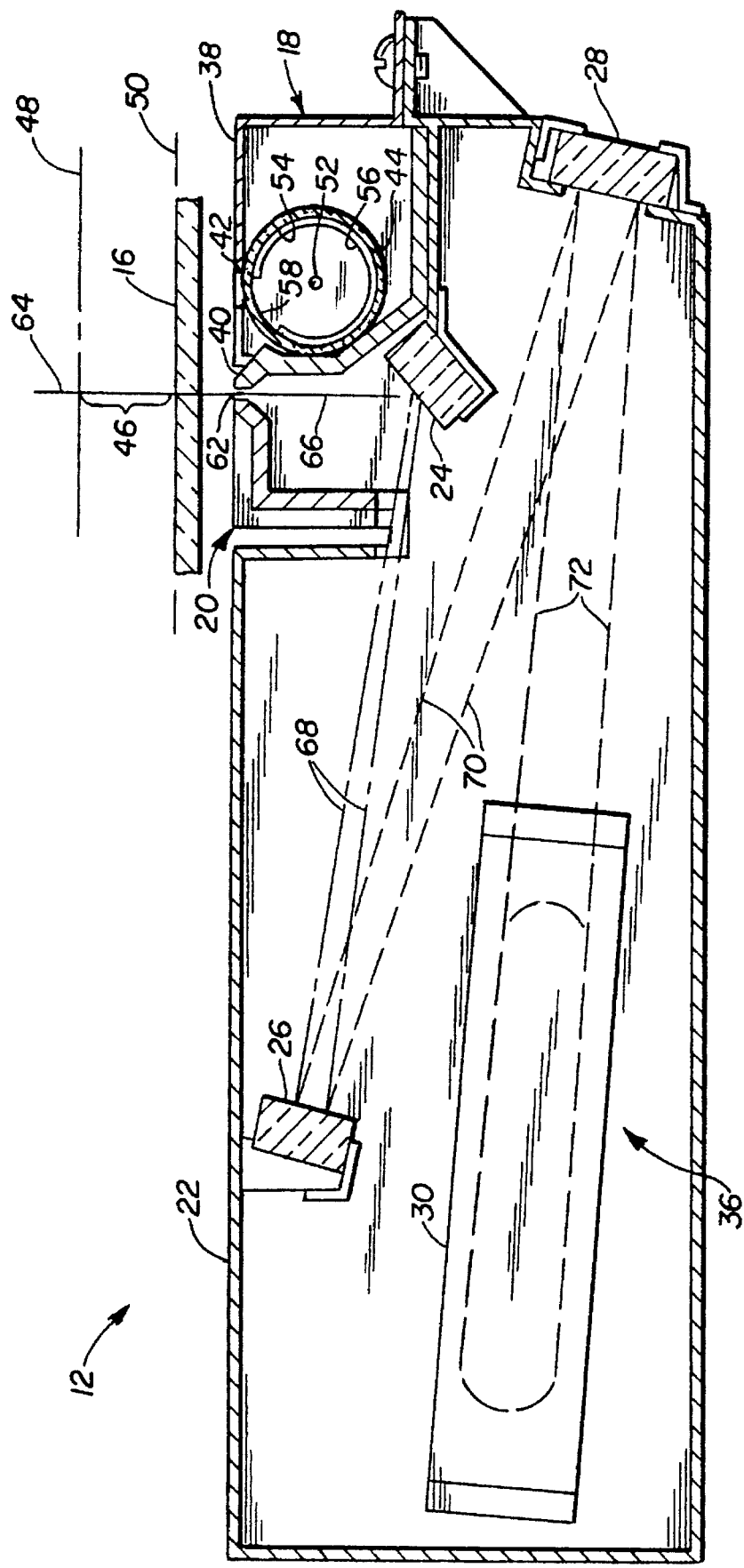
FIG. 4 is a sectional view in elevation of the carriage assembly taken along the line 4—4 in FIG. 3 showing the arrangement of the lamp and slit aperture assemblies, as well as a portion of the optical system.

An optical scanner 10 having enhanced depth of illumination is best seen in FIGS. 2–4 and includes a carriage assembly 12 within which are mounted a light source or lamp assembly 18 (FIG. 4) for illuminating an object (not shown) being scanned, as well as an optical system 36 (FIG. 4) for focusing an image of the object onto the surface of a photosensor array or detector 34 (FIG. 3). Carriage assembly 12 may be mounted within scanner housing 14 by any one of a number of convenient means (not shown) well known in the art so that it can be moved along scanning axis A—A to facilitate the scanning of an object positioned on the platen glass 16.

The carriage assembly 12 is best seen in FIGS. 3 and 4 and includes a light source or lamp assembly 18 and a field stop assembly 20, both of which are mounted to a support chassis 22. Support chassis 22 of carriage assembly 12 also includes suitable mounting points for the various components of the optical assembly 36, including mirrors 24, 26, 28, and 30, as well as a lens assembly 32, which directs and focuses light 66 reflected from the object being scanned onto the surface of the detector 34.

Lamp assembly 18 and field stop 20 form the heart of the invention and together define a lamp aperture 42 that provides different amounts of illumination to different points in the scan region 46. The varying amounts of illumination made possible by the lamp aperture 42 helps to provide more uniform illumination of the scan region 46.

Referring now to FIG. 4, lamp assembly 18 includes a lamp or "dogbone" shade 38, which, in combination with an opposed shade 40 on field stop 20, forms a light blocking shade or lamp aperture 42. The geometry of the lamp aperture 42, light source or lamp 44, and scan region 46 is such that lamp aperture 42 controls the amount of light from the light source or lamp 44 that is allowed to reach the various points within the scan region 46. In one embodiment, the lamp aperture 42, defined by the respective shades 38 and 40, provides increased illumination to the "far points" (i.e., those points in the scan region 46 that are located near the far limit focal plane 48) than to the "near points" (i.e., those points in the scan region 46 that are located closer to the near limit focal plane 50).

The lamp aperture 42 may also be configured to compensate for the illumination reduction problems associated with points located near the ends of the scan line, as well as for intensity variations along the length of the lamp 44. For example, in one embodiment, the shades 38 and 40 that define lamp aperture 42 are curved so that a larger portion of the lamp 44 is exposed to points in the scan region 46 that are located near each end 76, 78 of the lamp 44, than is exposed to points in the scan region 46 that are located near the center of lamp 44.

A significant advantage of the optical scanner 10 is that the lamp aperture 42 allows the far points in scan region 46 to receive more illumination, or at least realize less of a loss of illumination, than the near points in scan region 46. The resulting enhanced illumination generally allows the far points in scan region 46 to be illuminated sufficiently to be detected by the detector 34, while at the same time helping to ensure that the near points in the scan region 46 are not illuminated excessively, which could adversely affect scanner performance, or even overload the detector 34.

Another advantage of the optical scanner 10 and lamp assembly 18 is that the lamp aperture 42 defined by lamp shade 38 and opposed shade 40 can also be configured to compensate for the effective reduction in illumination of points near each end of the detector 34 by increasing the size of the lamp aperture 42 near each end 76, 78 of the lamp 44. Intensity variations along the length of the lamp 44 may also be compensated for in this manner.

The details of the optical scanner 10 having enhanced depth of illumination are best seen by referring to FIGS. 2–4 simultaneously. Essentially, the optical scanner 10 comprises a housing 14 within which are mounted the carriage assembly 12, as well as numerous other components (not shown) required for the operation of the scanner. As was described above, carriage assembly 12 may be mounted within scanner housing 14 by any one of a number of convenient means well known in the art so that it can be moved along scanning axis A—A to facilitate the scanning of the object (not shown) positioned on the platen glass 16.

Carriage assembly 12 includes a support chassis 22 to which are mounted the lamp assembly 18, field stop 20, as well as mirrors 24, 26, 28, and 30, and lens assembly 32, as best seen in FIG. 4. In one preferred embodiment, support chassis 22 is made from a reinforced polycarbonate material, although a wide range of other materials, such as aluminum, could be used as well.

Figure 5:
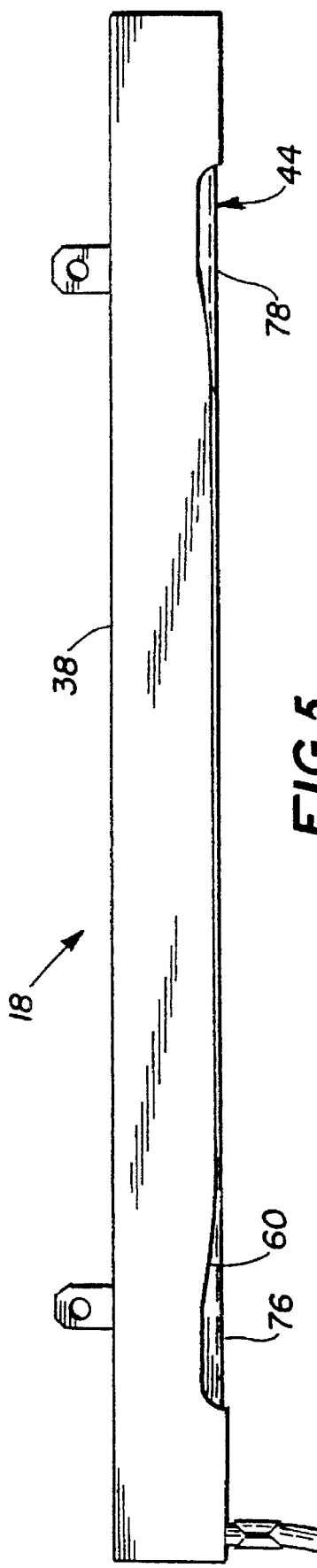
FIG. 5 is a plan view of the lamp assembly.

Lamp assembly 18 includes an elongate fluorescent lamp 44 aligned along a longitudinal axis 52. Lamp 44 may be of conventional design and include an interior surface 54 that is partially coated with a phosphor layer 56 so that a transparent window section 58 is defined adjacent lamp aperture 42. Fluorescent lamp 44 may be mounted within the lamp shade 38 by any convenient means, such as by clips or by an adhesive (not shown). Lamp shade 38 also has a curved edge 60, as best seen in FIG. 5, and, in one embodiment, is made from sheet aluminum, although other materials could also be used.

Figure 6:
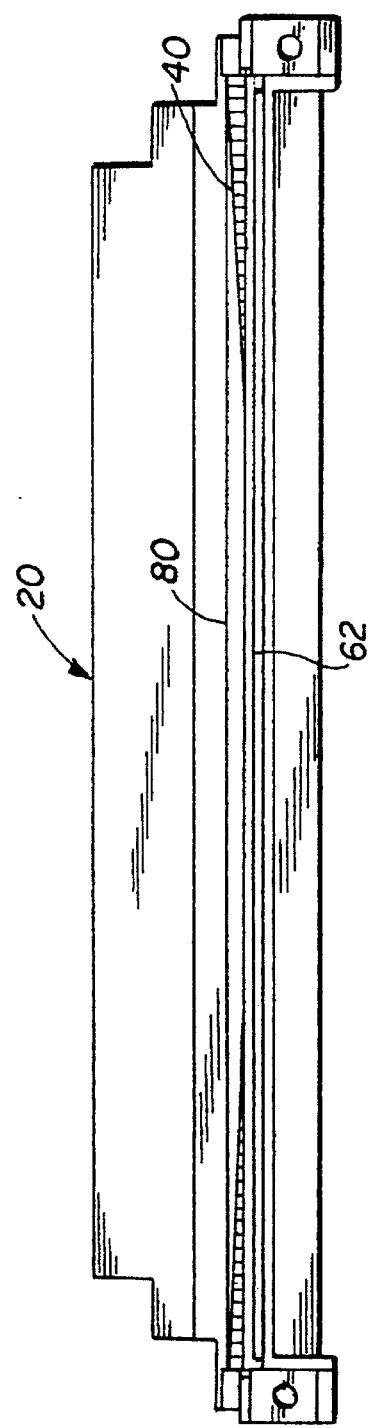
FIG. 6 is a plan view of the slit aperture assembly.
Figure 7:
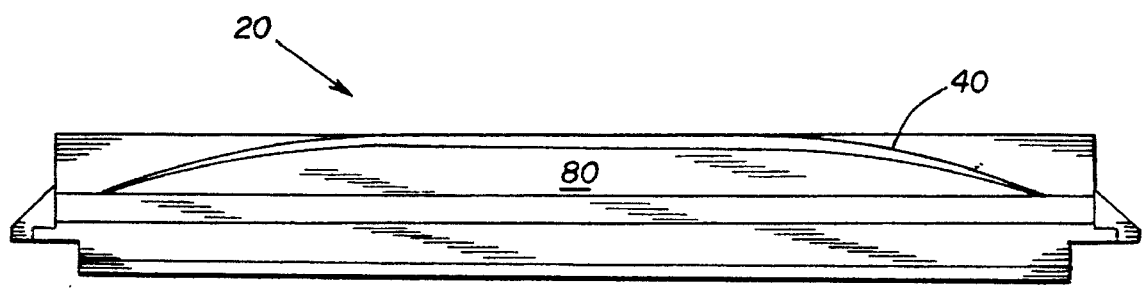
FIG. 7 is a side view in elevation of the slit aperture assembly.

Field stop 20 is mounted adjacent lamp assembly 18, as best seen in FIG. 4, and may be made from cast aluminum or other like material. Field stop 20 includes a slit 62 which functions as an aperture for the optical system 36 and defines a scan plane 64. Field stop 20 also includes a curved opposed shade 40, as best seen in FIGS. 4, 6, and 7, which, in one embodiment, forms an integral part of field stop 20, although it may also comprise a separate piece.

Optical system 36 is best seen by referring to FIGS. 3 and 4 simultaneously and includes a plurality of mirrors 24, 26, 28, and 30, a converging lens assembly 32, and a linear photosensor array or detector 34, which may comprise a charge coupled device (CCD). Mirrors 24, 26, 28, and 30 reflect rays 66 from the illuminated object (not shown) along a light path having a plurality of segments 68, 70, 72, and 74. The light rays from light path segment 74 are then collected by lens assembly 32, which focuses the light onto the surface of detector 34. See FIG. 3. As was briefly described above, the optical system 36 has a relatively large depth of field, so that light from points located in scan region 46 defined by a near limit focal plane 50 and a far limit focal plane 48 will be substantially focused onto the detector 34. Actually, the near limit focal plane 50 may be located slightly below the top surface 84 of platen glass 16 to compensate for the refraction of light through the platen glass 16, as would be well-known to persons having ordinary skill in the art.

The lamp assembly 18 and field stop 20 together define the lamp aperture 42 which may be configured to provide the desired amount of illumination to the various points within the scan region 46, i.e., those points lying in scan plane 64 and bounded at an upper edge by far limit focal plane 48 and at a lower edge by a near limit focal plane 50. The lamp aperture 42 may also be configured to compensate for the effective loss in illumination near the ends of the scan line, as well as for any decrease in intensity near ends 76 and 78 of lamp 44.

Figure 8A:
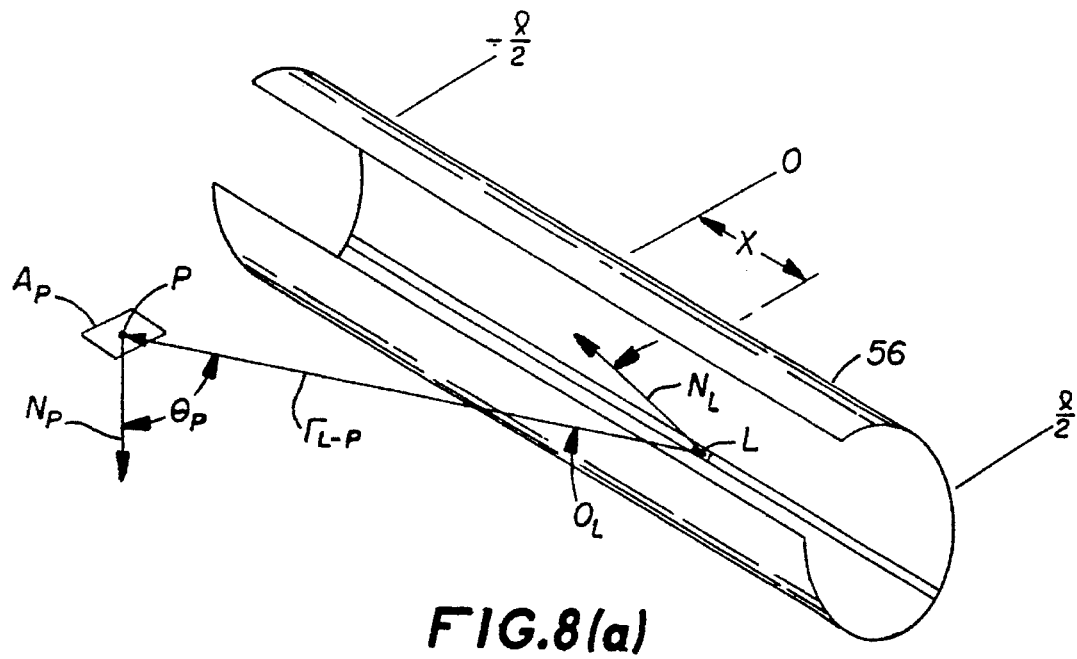
FIG. 8(*a*) is a schematic view in perspective showing the illumination of a point by an element of a phosphor coating of a cylindrical lamp.
Figure 8B:
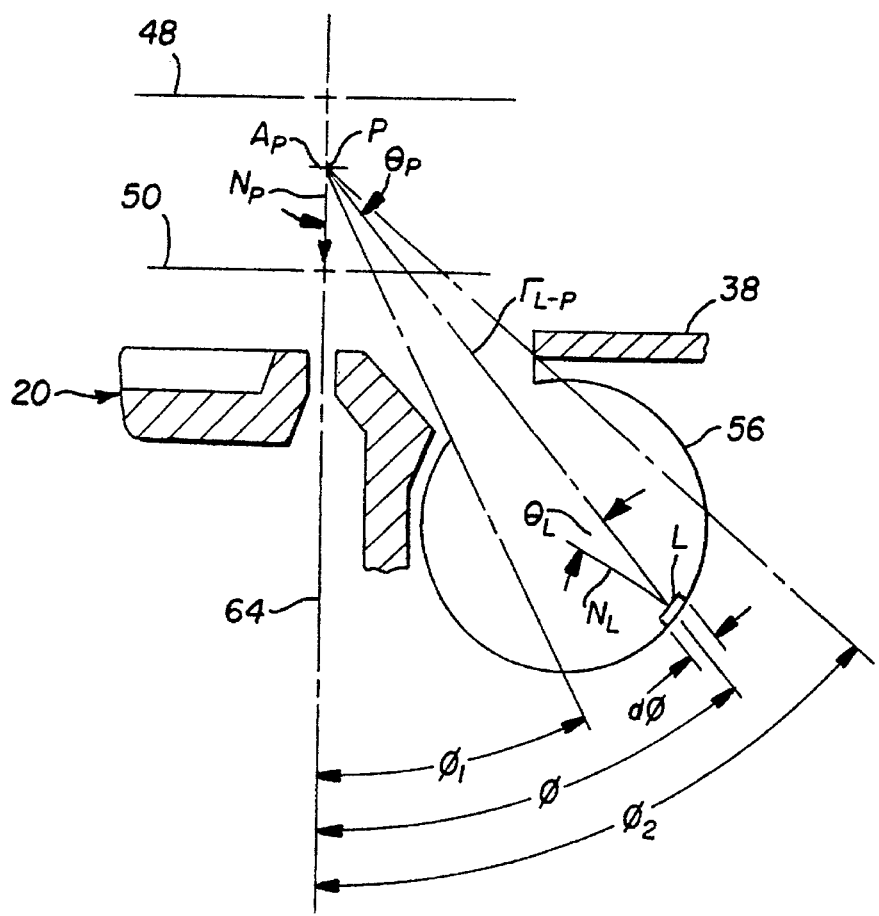

Referring now to FIGS. 8(a) and 8(b), the illumination $I_P$ reaching any particular point P having an area $A_P$ located within scan region 46 may be determined by determining the amount of light incident on point P from an infinitesimal element L of the phosphor, then integrating over the "window," i.e., that portion of the phosphor coating 56 that is "visible" or exposed to point P. Put another way, the illumination $I_P$ is given by the following relation:

$$I_P \propto 2A_P i_L \int_{\phi_1}^{\phi_2} \int_0^{l/2} \frac{\cos\theta_P \cos\theta_L}{(r_{LP})^2} \, dx \, d\phi$$

where:

$N_L$ = Normal to phosphor lamp surface 56;

$N_P$ = Normal to point P (i.e., perpendicular to platen glass 16);

x = Position from the center line O of lamp 44;

$\theta_P$ = Angle between $r_{L-P}$ and $N_P$;

$\theta_L$ = Angle between $r_{L-P}$ and $N_L$;

$i_L$ = Light intensity leaving lamp; and $A_P$ = Area of illuminated point P.

Therefore, the desired amount of illumination can be provided to the various points in the scan region 46 by using the above identified relation to adjust the size of the aperture 42.

Figure 9:
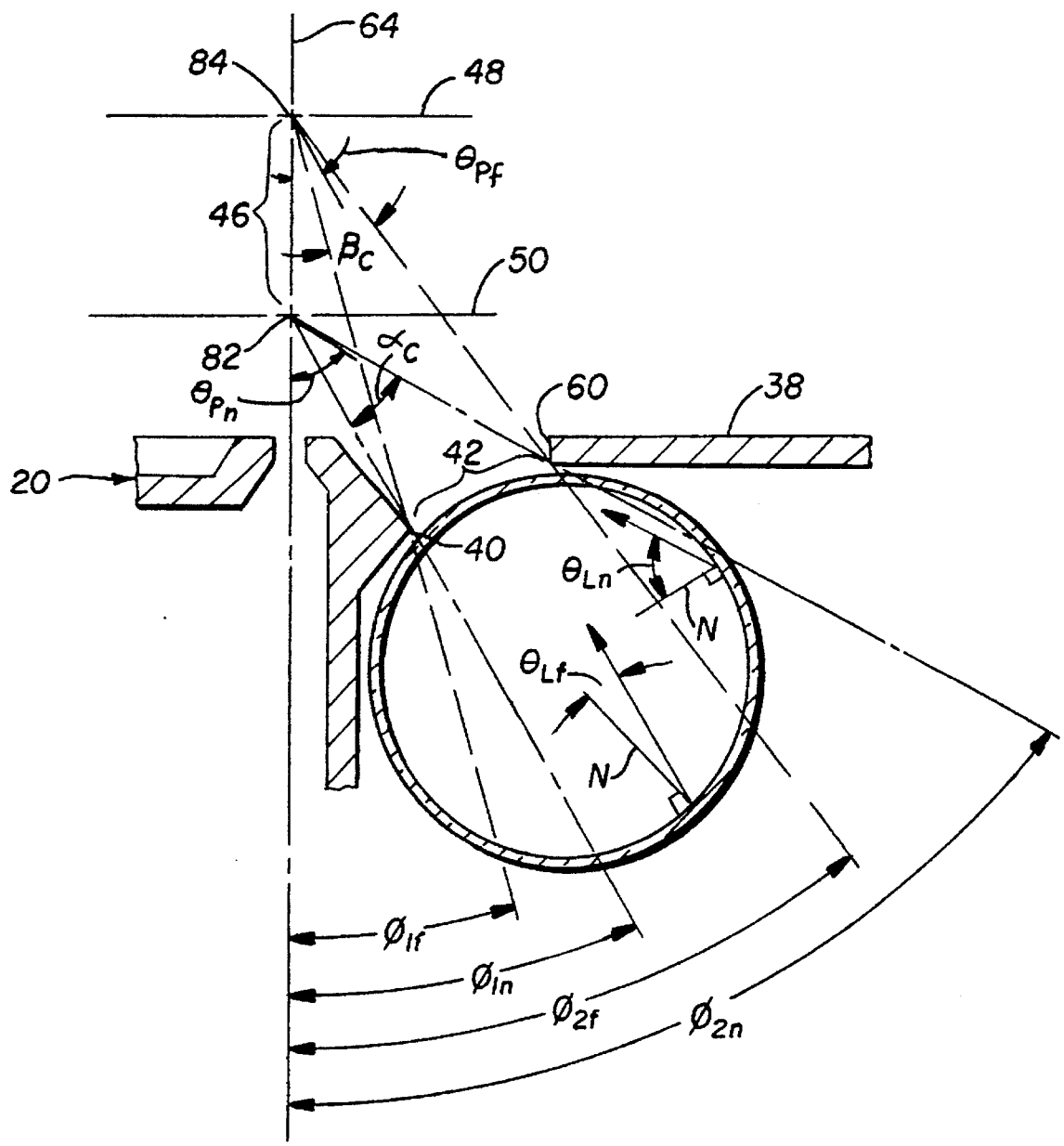
FIG. 9 is a sectional view in elevation of the lamp and slit aperture assemblies taken along the line 9—9 of FIG. 3.

Referring now to FIG. 9, the lamp aperture 42 can be made to provide varying amounts of illumination to points in the scan region 46 by varying the "window" with respect to each point. For example, the lamp aperture 42 subtends an angle of $\alpha_c$ with respect to a line 82 defined by the intersection of the scan plane 64 with the near limit focal plane 50 and generally parallel to longitudinal axis 52 (line 82 is perpendicular to the plane of the paper in FIG. 8, and is thus seen as a point). Therefore, the angle $\alpha_c$ may be thought of as the "window" for those points located on line 82. Likewise, the lamp aperture 42 subtends an angle $\beta_c$ with respect to a line 84 defined by the intersection of the scan plane 64 with the far limit focal plane 48 and generally parallel to longitudinal axis 52, which is the "window" for those points located on line 84. In the nomenclature of the illumination relation given above, $\alpha_c = \phi_{2n} - \phi_{1n}$ for the "near points" along line 82 (the subscript "n" denoting near points), whereas $\beta_c = \phi_{2f} - \phi_{1f}$ for the "far points" along line 84 (the subscript "f" denoting far points).

The ability to provide increased illumination to the far points (e.g., points along line 84), while at the same time preventing excess illumination to the near points (e.g., points along line 82) is due primarily to two factors. First, the illumination provided to the far points can be increased by increasing the "window" of those points with respect to the lamp 44. That is, by increasing the angle $\beta_c$ in relation to the angle $\alpha_c$. The illumination provided to the far points is also increased in relation to the illumination provided to the near points since the light rays illuminating the far points emanate from the phosphor coating 56 at small angles with respect to the local normal N compared to the light rays that illuminate the near points. See FIG. 9. That is, $\theta_{Lf}$ (the subscript "f" again denoting the far points) is considerably less than $\theta_{Ln}$ (the subscript "n" denoting the near points). The illumination is further enhanced since $\theta_{Pf}$ is less than $\theta_{Pn}$. As is well known, the illumination provided by a light source tends to be greatest along the normal to the light source, that is, the loss of illumination roughly follows the cosine of the angle $\theta$. Therefore, increased illumination is provided to the far points since the light rays illuminating the far points originated from the surface of the phosphor coating 56 at angles very near to the local normal N.

The respective magnitudes of the angles $\alpha_c$ and $\beta_c$ can be varied as necessary to provide the desired amount of illumination to the points within scan region 46. For example, the angle $\beta_c$ can be increased and the angle $\alpha_c$ decreased by increasing the size of the opposed shade 40, (i.e., increasing the amount by which shade 40 extends into the lamp aperture 42), while "cutting back" or moving the edge 60 of lamp shade 38 in the direction of arrow 86. Conversely, the angle $\beta_c$ can be decreased and the angle $\alpha_c$ increased by reducing the size of opposed shade 40, (i.e., reducing the amount by which shade 40 extends into the lamp aperture 42), while extending or moving the edge 60 of lamp shade 38 in a direction opposite arrow 86.

In one preferred embodiment having a depth of field in the range of about 5 mm to 20 mm, the angle $\alpha_c$ is in the range of 4 to 10 degrees, while the angle $\beta_c$ is in the range of 13 to 30 degrees. Selecting the angles $\alpha_c$ and $\beta_c$ to be within these ranges will result in an aperture 42 that will selectively block some of the light rays from the lamp 44 directed to the scanning region 46 so that the number of light rays incident on points near the intersection of the scan plane 64 and the far limit focal plane 48 is in the range of about 33% to 150% of the number of light rays incident on points near the intersection of the scan plane 64 and the near limit focal plane 50.

In addition to enhancing the amount of illumination provided to points in the scan region 46 near the center of the scan line, as described above, lamp aperture 42 can also be configured to compensate for the effective loss in illumination near the ends of the scan line, as well as for any decrease in intensity near ends 76, 78 of lamp 44. In order to compensate for those effects, the size of the lamp aperture 42 must be increased near each end 76, 78 of lamp 44 by curving both the edge 60 of lamp shade 38 and the opposed shade 40 in the manner shown in FIGS. 5 and 7. Advantageously, such end illumination enhancement can be accomplished without significantly affecting the enhanced illumination distribution between the near points and far points, as described above.

Figure 10:
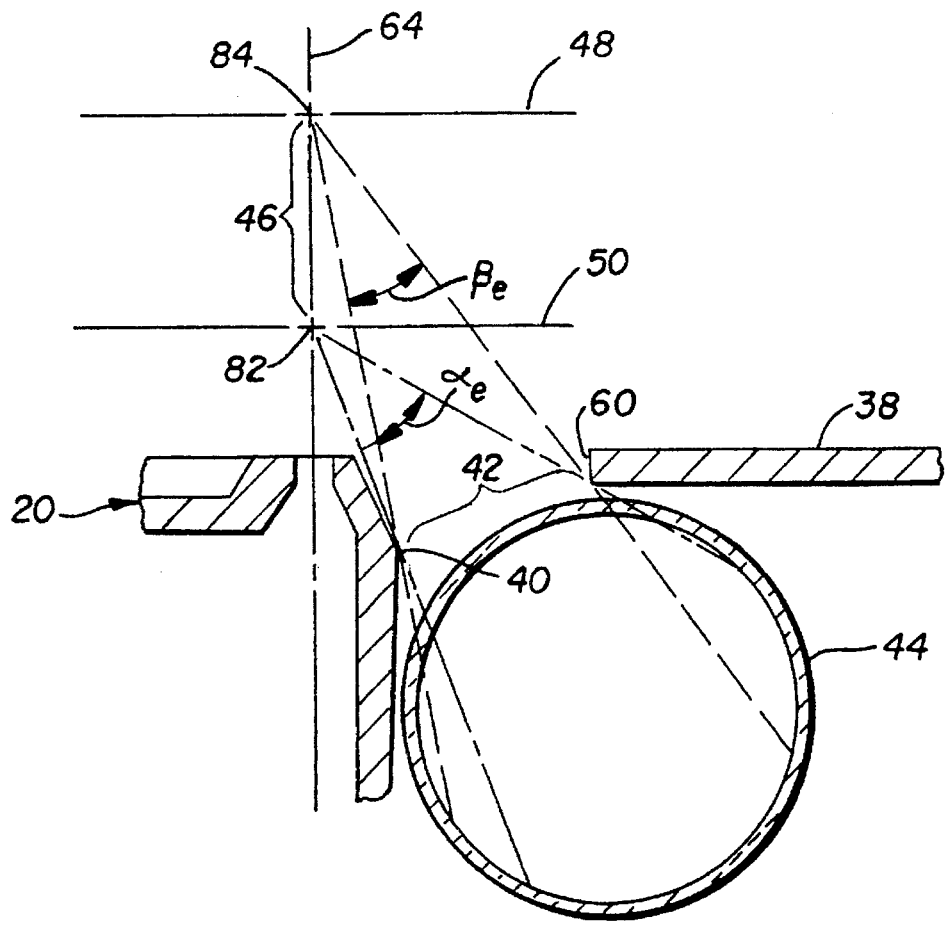
FIG. 10 is a sectional view in elevation of the lamp and slit aperture assemblies taken along the line 10—10 of FIG. 3.

The geometrical relationship near the end 76 of lamp assembly 18 that results from curved edge 60 and opposed shade 40 is shown in FIG. 10. Essentially, the lamp aperture 42 defined between edge 60 of lamp shade 38 and opposed shade 40 subtends an angle $\alpha_e$ with respect to the line 82, while the lamp aperture 42 subtends an angle $\beta_e$ with respect to the line 84. Both the angles $\alpha_e$ and $\beta_e$ are greater then the corresponding angles near the center of the lamp, i.e., $\alpha_c$ and $\beta_c$ (FIG. 9), which tends to increase the illumination of those points. Also, the curved shape of the edge 60 of lamp shade 38 as well as the curved shape of shade 40 will cause the angles $\alpha$ and $\beta$ to gradually increase from the center of the lamp 44 towards each respective end 76, 78, thus providing a gradually increasing illumination to the various points in the scan region 46.

In one preferred embodiment having a depth of field in the range of about 5 mm to 20 mm, the angle $\alpha_e$ is in the range of 18 to 40 degrees, while the angle $\beta_e$ is in the range of 7 to 15 degrees. Therefore, the "windows" near the center of the lamp (i.e., the angles $\alpha_c$ and $\beta_c$) are only about 50% to 75% of the "windows" near the ends of the lamp (i.e., the angles $\alpha_e$ and $\beta_e$).

The size and shape of the curved edge 60 of lamp shade 38, as well as the shape of the opposed shade 40, thus the varying size of the lamp aperture 42 with respect to various points in the scan region 46, may be determined on an empirical basis depending on the particular characteristics of the optical system 36, the lamp 44, as well as the desired depth of illumination. For example, if the desired depth of illumination is to be large, or the lamp intensity relatively low, it will be necessary to increase the overall size of the lamp aperture 42 by "cutting back" the curved edge 60 of shade 38 to expose more of the lamp 44. Proportionally greater illumination can be provided to those points in the scan region 46 that are near the far limit focal plane 48 by increasing the amount that the opposed shade 40 intrudes into the lamp aperture 46, which increased intrusion has the effect of proportionally reducing the amount or area of the lamp 44 that is exposed to points in the scan region 46 that are closer to the near limit focal plane 50.

If the lamp 44 provides relatively constant intensity along its length, then the respective curvatures of the edge 60 of shade 38 as well as opposed shade 40 may be reduced somewhat. Conversely, if the intensity of the lamp 44 falls off significantly near the respective ends 76 and 78, then it will be necessary to increase the curvatures of the edge 60 and shade 38 to provide proportionally more illumination to those points in the scan region 46 near each end of the scan region.

Figure 11:
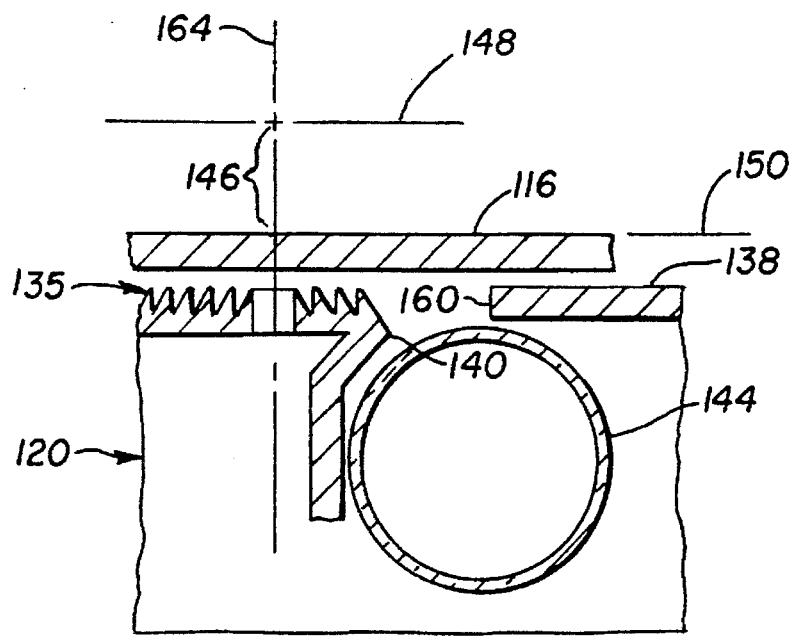
FIG. 11 is a sectional view in elevation of an alternate embodiment of the lamp and slit aperture assemblies.

Another embodiment of the light shade and slit aperture assembly is shown in FIG. 11. Essentially, this embodiment is identical to the embodiments described above, except that the slit aperture assembly 120 includes a plurality of grooves 135 that act as "light traps" to prevent stray light from being reflected into the scan region 146. The opposed shade 140 in the embodiment shown in FIG. 11 is also configured with respect to lamp shade 138 such that $\theta_{Lf}$ is even smaller than $\theta_{Lf}$ for the embodiments shown earlier, thus further reducing illumination loss to the far points.

It is contemplated that the inventive concepts herein described may be variously otherwise embodied and it is intended that the appended claims be construed to include alternative embodiments of the invention except insofar as limited by the prior art.

What is claimed is:

1. A light source assembly for illuminating a scan region lying in a scan plane and bounded at a lower edge by a near limit focal plane and at an upper edge by a far limit focal plane, the near and far limit focal planes being in parallel, spaced-apart relation and perpendicular to the scan plane, comprising:

an elongate light source positioned along a longitudinal axis; and light blocking apparatus positioned adjacent said elongate light source for blocking light rays from said elongate light source so that points on the scan region located at about the near limit focal plane receive a first illumination and points on the scan region located at about the far limit focal plane receive a second illumination, said first and second illuminations being within a predetermined detectable range of illumination.

2. The light source assembly of claim 1, wherein said light blocking apparatus includes first and second light shades positioned in parallel, spaced-apart relation to the longitudinal axis of said elongate light source, said first and second light shades defining a lamp aperture that subtends a first angle with respect to a first line defined by the intersection of the scan plane with the near limit focal plane and that subtends a second angle with respect to a second line defined by the intersection of the scan plane with the far limit focal plane.

3. The light source assembly of claim 2, wherein said first angle varies along the length of said elongate light source.

4. The light source assembly of claim 3, wherein said second angle varies along the length of said elongate light source.

5. The light source assembly of claim 4, wherein said first angle is greater at points about at each end of said elongate light source than at points about midway between each end of said elongate light source.

6. The light source assembly of claim 5, wherein said second angle is greater at points about at each end of said elongate light source than at points about midway between each end of said elongate light source.

7. The light source assembly of claim 6, wherein said first angle subtended by said lamp aperture at points substantially midway between each end of said elongate light source is in the range of about 50% to 75% of said first angle subtended by said lamp aperture at points near each end of said elongate light source.

8. The light source assembly of claim 7, wherein said second angle subtended by said lamp aperture at points substantially midway between each end of said elongate light source is in the range of about 50% to 75% of said second angle subtended by said lamp aperture at points near each end of said elongate light source.

9. The light source assembly of claim 8, wherein said first angle subtended by said lamp aperture at points substantially midway between each end of said elongate light source is in the range of about 13 to 30 degrees.

10. The light source assembly of claim 9, wherein said second angle subtended by said lamp aperture at points substantially midway between each end of said elongate light source is in the range of about 4 to 10 degrees.

11. The light source assembly of claim 10, wherein said first angle subtended by said lamp aperture at points near each end of said elongate light source is in the range of about 7 to 15 degrees.

12. The light source assembly of claim 11, wherein said second angle subtended by said lamp aperture at points near each end of said elongate light source is in the range of about 18 to 40 degrees.

13. The light source assembly of claim 12 including an elongate slit aperture positioned adjacent said elongate light source and along an axis that is substantially parallel to said longitudinal axis.

14. The light source assembly of claim 13, wherein said first light shade is attached to said elongate slit aperture.

15. The light source assembly of claim 13, wherein said first light shade is integral with said elongate slit aperture.

16. The light source assembly of claim 13, wherein said elongate light source comprises a fluorescent lamp.

17. The light source assembly of claim 13, wherein the spaced distance between said near limit focal plane and said far limit focal plane is in the range of about 5 mm to 20 mm.

18. A method of illuminating points on an object lying in an illuminated scan region lying in a scan plane and bounded at a lower edge by a near limit focal plane and at an upper edge by a far limit focal plane, the near and far limit focal planes being in parallel, spaced-apart relation and substantially perpendicular to the scan plane, comprising the steps of:
  generating a plurality of light rays from a light source positioned closer to the near limit focal plane than the far limit focal plane;
  directing some of said light rays towards the object; and
  blocking some of said light rays directed to the object so that the number of light rays incident on points on the object near the intersection of said scan plane and said far limit focal plane is in a range of about 33% to 150% of the number of light rays incident on points on the object near the intersection of said scan plane and said near limit focal plane.

19. A light source assembly for illuminating a scan region lying in a scan plane and bounded at a lower edge by a near limit focal plane and at an upper edge by a far limit focal plane, the near and far limit focal planes being in parallel, spaced-apart relation and perpendicular to the scan plane, comprising:
  an elongate light source positioned along a longitudinal axis;
  an elongate slit aperture positioned adjacent said elongate light source and along an axis that is substantially parallel to said longitudinal axis;
  a first light shade attached to said elongate slit aperture; and
  a second light shade positioned adjacent said elongate light source, said first and second light shades defining a lamp aperture that subtends a first angle with respect to a first line defined by the intersection of the scan plane with the near limit focal plane and that subtends a second angle with respect to a second line defined by the intersection of the scan plane with the far limit focal plane.

20. The light source assembly of claim 19, wherein said first angle varies along the length of said elongate light source.

21. The light source assembly of claim 20, wherein said second angle varies along the length of said elongate light source.

22. The light source assembly of claim 21, wherein said first angle is greater at points about at each end of said elongate light source than at points about midway between each end of said elongate light source.

23. The light source assembly of claim 22, wherein said second angle is greater at points about at each end of said elongate light source than at points about midway between each end of said elongate light source.

24. The light source assembly of claim 23, wherein said first angle subtended by said lamp aperture at points substantially midway between each end of said elongate light source is in the range of about 50% to 75% of said first angle subtended by said lamp aperture at points near each end of said elongate light source.

25. The light source assembly of claim 24, wherein said second angle subtended by said lamp aperture at points substantially midway between each end of said elongate light source is in the range of about 50% to 75% of said second angle subtended by said lamp aperture at points near each end of said elongate light source.

26. The light source assembly of claim 25, wherein said first angle subtended by said lamp aperture at points substantially midway between each end of said elongate light source is in the range of about 13 to 30 degrees.

27. The light source assembly of claim 26, wherein said second angle subtended by said lamp aperture at points substantially midway between each end of said elongate light source is in the range of about 4 to 10 degrees.

28. The light source assembly of claim 27, wherein said first angle subtended by said lamp aperture at points near each end of said elongate light source is in the range of about 7 to 15 degrees.

29. The light source assembly of claim 28, wherein said second angle subtended by said lamp aperture at points near each end of said elongate light source is in the range of about 18 to 40 degrees.

* * * * *